FIP8305 XR T 862,006 1969 CROSS REFERENCE SEARCH ROOM

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 23

T862,006

741,203

WASH OIL

David C. Hull, P.O. Box 2068, Longview, Tex. 75601

Filed June 28, 1968. Published May 6, 1969

Int. Cl. C11d *7/50, 7/22*

U.S. Cl. 252—162

No Drawing. 7 Pages Specification

A compressor vane wash oil comprising the following components:

| Component: | Liquid volume percent |
|---|---|
| Benzene | 1–2 |
| Toluene | 30–32 |
| Ethylbenzene | 20–21 |
| Paraxylene | 10–11 |
| Orthoxylene | 2–3 |
| C–9 and higher aromatic | 28–29 |
| Olefins and diolefins | 4–6 |